H. F. BALL.
LOCOMOTIVE TRUCK.
APPLICATION FILED JULY 5, 1913.

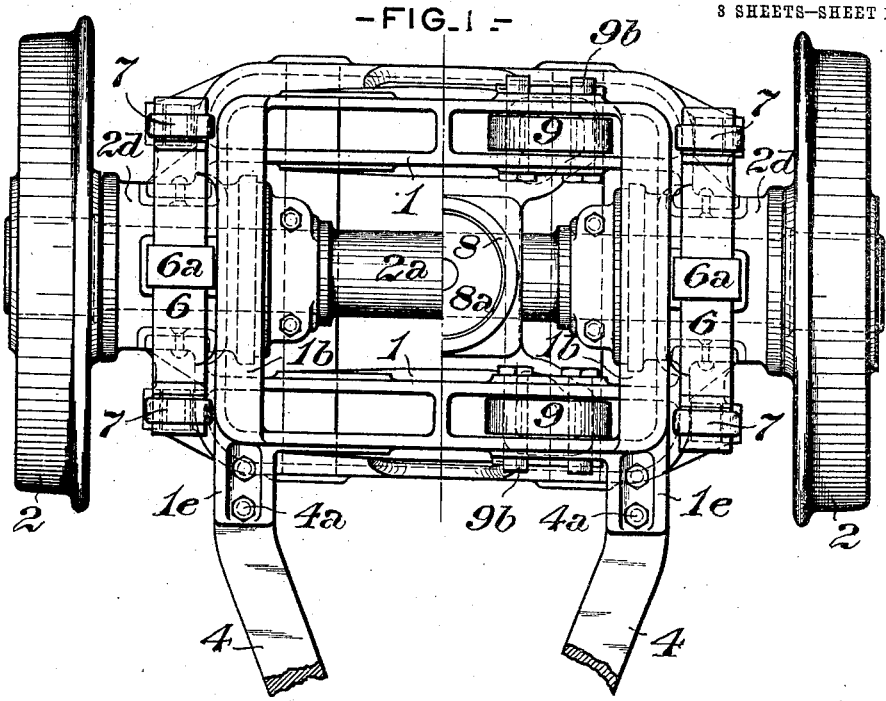

1,074,154.

Patented Sept. 30, 1913.

3 SHEETS—SHEET 2.

H. F. BALL.
LOCOMOTIVE TRUCK.
APPLICATION FILED JULY 5, 1913.
1,074,154.
Patented Sept. 30, 1913.
3 SHEETS—SHEET 3.
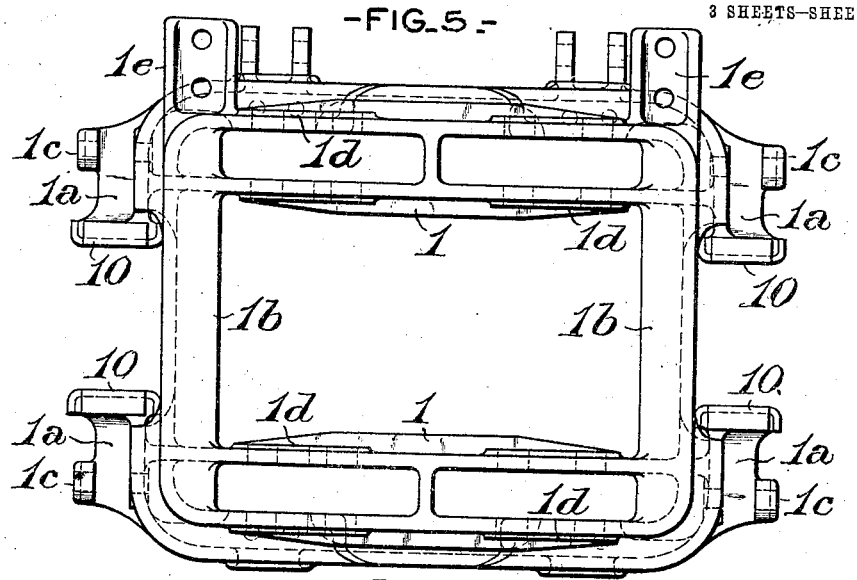
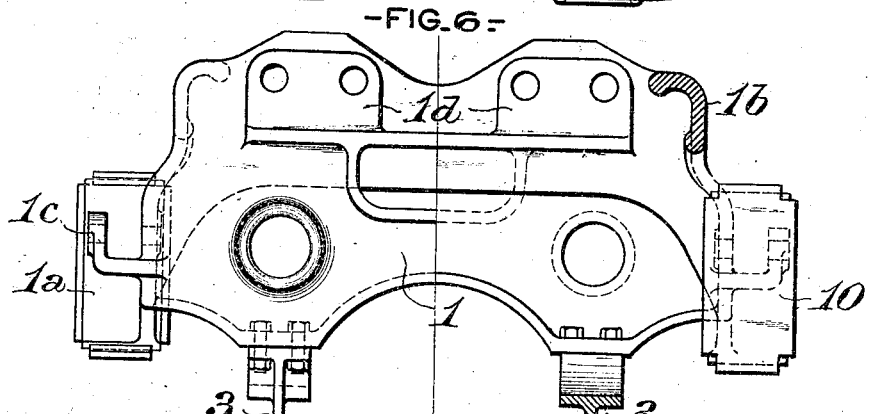
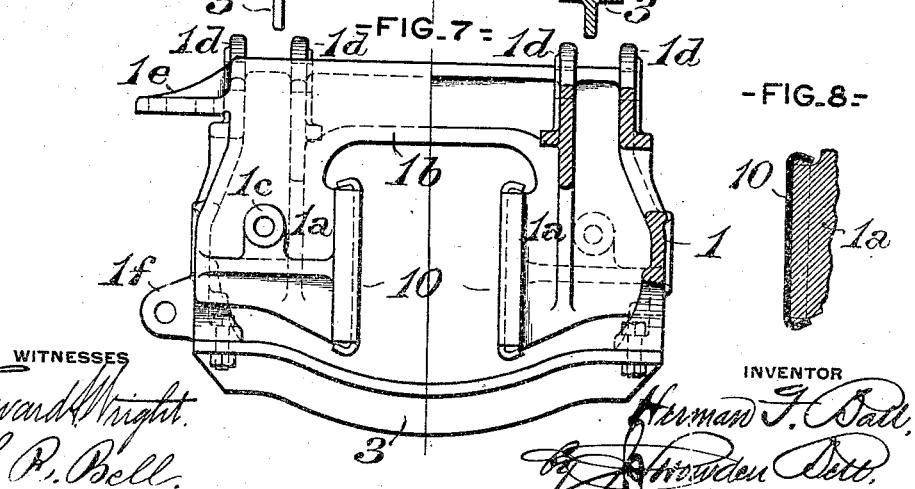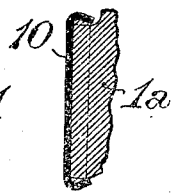
WITNESSES
Edward Wright.
S. P. Bell.
INVENTOR
Herman F. Ball,
by Snowden Bell
atty.

UNITED STATES PATENT OFFICE.

HERMAN F. BALL, OF NEW YORK, N. Y.

LOCOMOTIVE-TRUCK.

1,074,154.

Specification of Letters Patent. Patented Sept. 30, 1913.

Application filed July 5, 1913. Serial No. 777,376.

*To all whom it may concern:*

Be it known that I, HERMAN F. BALL, of the borough of Manhattan, in the city, county, and State of New York, have invented a certain new and useful Improvement in Locomotive-Trucks, of which improvement the following is a specification.

My invention relates to two wheeled leading or trailing trucks for locomotive engines, of the type known as "swing" or "lateral motion" trucks, and its object is to provide a truck of such type, the frame of which shall embody the advantages of strength, simplicity, and economy of construction, and ready accessibility for the insertion and removal of springs, axle boxes, and other accessories, and in which the application of elliptic springs is provided for, in an effective manner and without interference with requisite clearances.

The improvement claimed is hereinafter fully set forth.

Figure 3:
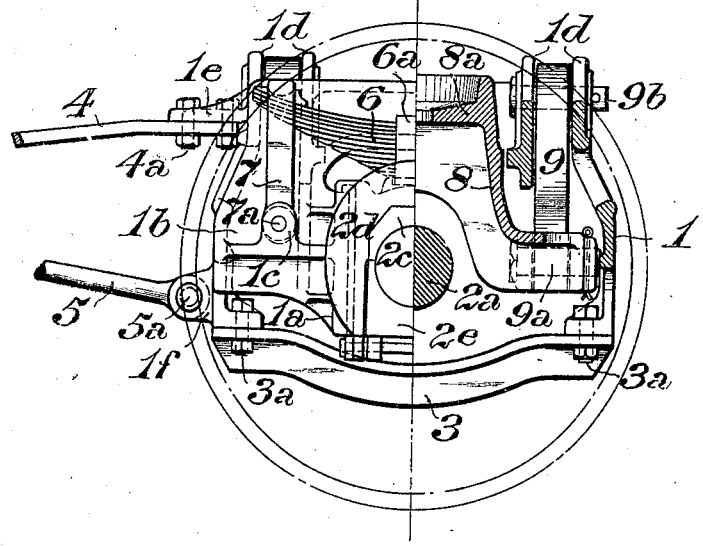
Figure 4:
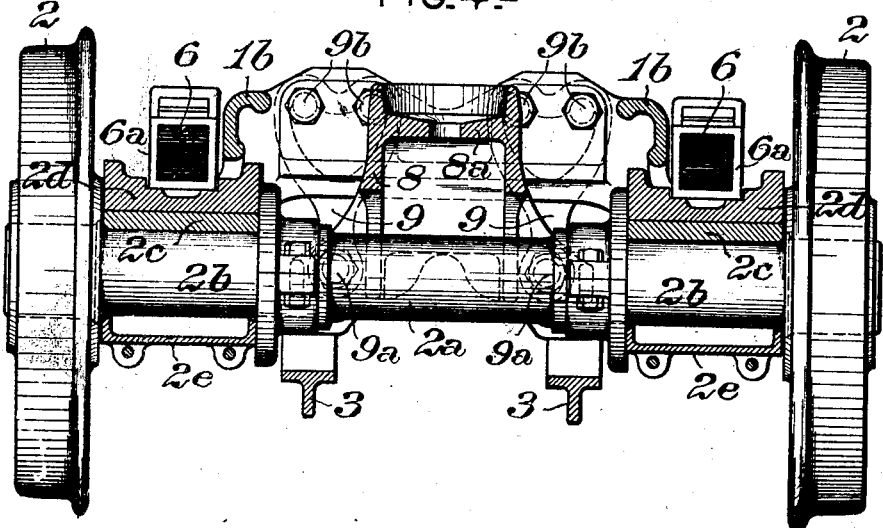

In the accompanying drawings: Figure 1 is a plan or top view of a locomotive truck embodying my invention, the right hand half showing the swing beam and connections in position, and the left hand half showing the truck with these members removed; Fig. 2, a rear view, in elevation; Fig. 3, a view, the left hand half of which is in side elevation, and the right hand half in section in the vertical longitudinal central plane of the locomotive; Fig. 4, a vertical section, in the plane of the truck axle; Fig. 5, a plan view, on an enlarged scale, of the truck frame; Fig. 6, a view of the same, on a similar scale, the left hand half of which is in front elevation, and the right hand half in vertical section, in the plane of the truck axle; Fig. 7, a view of the same, on a similar scale, the left hand half of which is in side elevation, and the right hand half in section in the vertical longitudinal central plane of the locomotive; and Fig. 8, a vertical section through a pedestal shoe and the adjoining portion of a pedestal jaw.

It is well recognized by those familiar with the construction and operation of locomotives, that elliptic springs attain easier riding qualities than those of the helical type, and for this reason, the former are used throughout the spring system of locomotives, including the truck, when the latter is four wheeled. Helical springs have been heretofore ordinarily applied in two wheeled trucks, by reason of the fact that, in many instances, the clearance limitations are such as to prevent the application of elliptic springs, although their use, throughout the locomotive, is, if practicable, very desirable. In two wheel trucks, which construction is that which is used in freight locomotives, almost exclusively, the clearance limitations between the truck frame and engine frame, vertically, and the clearances for the lateral movement of the truck bolster, have prevented the successful application of elliptic springs in trucks of the built up type.

My invention, hereinafter described, enables elliptic springs to be applied in two wheeled trucks for locomotives of all sizes, and combines the frame members, pedestals, and spring and swing hanger brackets in an integral structure of cast construction.

Referring to the drawings, my invention is herein exemplified in a two wheeled lateral motion leading truck, adapted to support the front portions of the main frame of a locomotive engine and the weight which is carried thereon. The truck frame is an integral casting, which is substantially of box form, and comprises two parallel front and rear side members, 1, 1, extending transversely of the locomotive, on the outer ends of each of which side members, there are formed pedestal jaws, $1^a$, $1^a$, which project outwardly from the side members, and are set at proper distances apart to receive the axle boxes, $2^d$, and two parallel end members, $1^b$, $1^b$, connecting the side members one to the other. The side members are also connected by tie bars, 3, of T section, which are secured to their lower sides by bolts, $3^a$, and nuts. The function of the tie bars is analogous to that of the pedestal tie bolts heretofore employed, but instead of being located below the axle boxes, as in ordinary practice, they are, as most clearly shown in Figs. 2 and 4, connected to the side frame members in planes on the inner sides of, and entirely clear of, the axle boxes. Under this construction, the axle box cellars, $2^e$, may be removed and replaced whenever desired, without detaching the tie bars, and a reduction in the depth of the pedestal jaws, and consequent reduction of the weight of the frame, is also effected.

The truck frame being, as above described, an integral structure, it is very desirable that means should be provided for preventing such wear of the pedestal jaws as might necessitate the loss of the entire frame. To this end, the wearing surface of each of the pedestal jaws, 1ª, against which surface the adjacent side of the axle box abuts, is formed on a detachable shoe, 10, consisting of a metal plate having side flanges which are bent over against the sides of the pedestal jaw, and top and bottom flanges which are similarly bent over against inclined faces on the top and bottom of the jaw. It will be seen that the shoe can be readily attached to, and detached from, the pedestal jaw, as may be required, and that, in service, it is held firmly in position without necessitating any perforation of the jaw or the use of separate fastening devices of any description.

Spring hanger bearings, 1ᶜ, 1ᶜ, are formed on the outer sides of the end members, 1ᵇ, 1ᵇ, in front and in rear of the pedestal jaws, and spring hanger bearings, 1ᵈ, 1ᵈ, 1ᵈ, 1ᵈ, are formed on the side frame members, 1, 1, adjacent to their tops. Lugs, 1ᵉ, 1ᵉ, are also formed on the side frame members, near their tops, to which lugs the radius bars, 4, 4, are connected by bolts, 4ª, and lugs, 1ᶠ, 1ᶠ, are formed on the side frame members, near their lower sides, to which lugs, brace rods, 5, are connected by bolts, 5ª.

The truck wheels, 2, are secured, in the usual manner, on the outer ends of the truck axle, 2ª, the journals, 2ᵇ, of which, rotate in bearings, 2ᶜ, fixed in axle boxes, 2ᵈ, each of which is fitted to traverse vertically between the members of one of the pairs of pedestal jaws, 1ª, 1ª. The truck frame is supported on the axle boxes through the intermediation of elliptic springs, 6, the bands, 6ª, of which, are seated in recesses in the tops of the axle boxes, and the end portions of which abut against spring hangers, 7, the lower ends of which are coupled, by pins, 7ª, to the spring hanger bearings, 1ᶜ. The spring suspension thus provided, is equivalent to the support of the load at the ends of the front and rear side frame members, 1, 1, and imparts the minimum of strain to the end frame members, 1ᵇ, 1ᵇ, thereby enabling the dimensions of the latter members to be reduced to a minimum, and admitting of the maximum clearance for the lateral movements of the swing beam, and for ample vertical clearance between the truck frame and engine frame. It will be observed that the springs may be removed and replaced, without removing the truck from the locomotive, by simply taking the load off the springs.

The capacity of lateral motion of the truck frame and its axle and wheels, relatively to the main frame of the locomotive, for the purpose of facilitating the passage of the locomotive to, through, and from curved portions of the track, is provided for by a swing beam or bolster, 8, which is located in the open space between the side and end members of the truck frame, and is suspended therefrom, with the capacity of lateral movement, relatively thereto. In the instance exemplified, what is known as the "three point suspension" is applied, the swing beam, 8, being hung from the truck frame on two pairs of swing hangers, 9, 9, 9, 9, the members of which, to the lower ends of which it is coupled by lower swing hanger pins, 9ª, extend downwardly between its sides and the side members, 1, 1, of the truck frame. The upper end of each of the swing hangers is pivoted to the truck frame by two upper swing hanger pins, 9ᵇ, each of which fits in a pair of the swing hanger bearings, 1ᵈ, of the truck frame, and in a corresponding open bottomed recess in the swing hanger. A lower center casting, 8ª, perforated for the passage of a center pin, is formed at the top of the swing beam, and is suitably recessed to receive the usual upper center casting, which is connected to the cylinder saddles or main frame of the locomotive, with the capacity of relative rotary movement.

The specific form of swing beam suspension which has been selected for illustration herein, it not of the essence of my invention, and any other suitable known type may, if desired, be substituted therefor, as, for example, the oppositely curved cam surface rocker construction set forth in Letters Patent of the United States No. 1,060,222, granted and issued to W. E. Woodard, under date of April 29, 1913. It will also be obvious to those skilled in the construction of railroad rolling stock, that my invention is applicable, without variation of structural or operative principle, in trucks having their bearings outside of the wheels, instead of inside of them as herein shown.

I claim as my invention and desire to secure by Letters Patent:—

1. A frame for a lateral motion truck, comprising, in an integral structure, front and rear side members extending transversely to the longitudinal central plane of a locomotive and connected by shorter end members, pedestal jaws projecting laterally from the end members, bearings on the end members in position for the connection of the hangers of elliptic springs, and swing hanger bearings on the side members.

2. In a lateral motion truck, the combination of an integral truck frame, comprising front and rear side members extending transversely to the longitudinal plane of a locomotive and connecting end members having laterally projecting pedestal jaws, and tie bars connecting the end frame members in planes on the inner sides of, and clear of, the pedestal jaws.

3. In a lateral motion truck, the combination of an integral truck frame comprising front and rear side members extending transversely to the longitudinal central plane of a locomotive and connecting end members having laterally projecting pedestal jaws, axle boxes fitting between the pedestal jaws, elliptic springs seated on said axle boxes, and spring hangers connecting the ends of said springs with bearings on the end members of the truck frame.

4. In a lateral motion truck, the combination of an integral truck frame, comprising front and rear side members extending transversely to the longitudinal central plane of a locomotive and connecting end members having laterally projecting pedestal jaws provided with inclined upper and lower faces, and detachable shoes fitting against the inner sides of the pedestal jaws and connected thereto by side and top and bottom flanges turned over against the adjoining surfaces of the pedestal jaws.

HERMAN F. BALL.

Witnesses:
J. SNOWDEN BELL,
EDWARD A. WRIGHT.